United States Patent [19]

Miller

[11] 3,920,121

[45] Nov. 18, 1975

[54] ELECTRIC TERMINAL CARRIER TAPE AND METHOD OF MANUFACTURE

[75] Inventor: James E. Miller, Westville, N.J.

[73] Assignee: Minnesota Mining and Manufacturing Company, St. Paul, Minn.

[22] Filed: Apr. 13, 1972

[21] Appl. No.: 243,781

[52] U.S. Cl. ............ 206/330; 339/216 SF; 428/136

[51] Int. Cl. ............ B32b 3/10; B32b 3/02

[58] Field of Search ........... 161/149, 110, 109, 113, 161/118, 114; 156/293, 298; 206/46 ED, 51, 328, 330; 339/276 SF; 16/108

[56] References Cited

UNITED STATES PATENTS

| | | | |
|---|---|---|---|
| 448,978 | 3/1891 | Meech | 161/110 X |
| 659,266 | 10/1900 | Stewart | 161/110 X |
| 2,303,777 | 12/1942 | Warshaw | 229/49 |
| 2,815,124 | 12/1957 | Pellier | 339/276 SF |
| 3,361,251 | 1/1968 | Olsson | 339/276 SF |
| 3,465,874 | 9/1969 | Hugle et al. | 206/56 A |
| 3,608,711 | 9/1971 | Wiesler et al. | 206/46 ED |
| 3,650,706 | 3/1972 | Parsons | 206/330 |
| 3,725,172 | 4/1973 | Fekete et al. | 156/252 |

*Primary Examiner*—George F. Lesmes
*Assistant Examiner*—Paul J. Thibodeau
*Attorney, Agent, or Firm*—Robert K. Youtie

[57] ABSTRACT

A carrier tape for electric terminals and method of manufacture wherein a strip is deformed along one edge to conformably receive the heads of terminals with the ferrules extending beyond the strip edge, and means is provided for releasably securing the terminal heads to the strip.

6 Claims, 6 Drawing Figures

ELECTRIC TERMINAL CARRIER TAPE AND METHOD OF MANUFACTURE

BACKGROUND OF THE INVENTION

While it has, in the past, been proposed to feed electric terminals for attachment to conductors by means of carrier tapes, such carrier tape means has not heretofore been found satisfactory, for many reasons. Prior constructions of such carrier tape were often expensive and time-consuming in manufacture and assembly with terminals, frequently lacking in sufficient restraint upon the terminals to insure accurate location thereof during feeding to an assembly station, and presenting difficulties in proper removal from the carrier tape by reason of being held too firmly or not firmly enough, all of which result in malfunction and downtime at the assembly location, and consequent high production costs.

SUMMARY OF THE INVENTION

It is, therefore, an important object of the present invention to provide a carrier tape for electric terminals and method of manufacturing the same which is extremely simple in structure and procedure of manufacture, wherein the electric terminals are effectively restrained in proper location relative to each other and the carrier tape to insure proper functional relationship with relatively high speed, automatic assembly apparatus, and wherein the electric terminals are properly releasably retained by the carrier tape to insure removal therefrom at the proper time without inadvertent partial removal or dislocation prior to assembly with electric conductors.

It is still a further object of the present invention to provide a carrier tape for electric terminals having the advantageous characteristics mentioned in the preceding paragraph, which is relatively inexpensive in its manufacture and assembly with electric terminals, the necessary tape formation being substantially coincident with assembly with terminals, and which is extremely well adapted for use in conjunction with high speed automatic apparatus for assembly with electrical conductors to effect substantial savings in time and costs.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description, and of which the scope will be indicated by the appended claims.

DESCRIPTION OF THE PREFERRED EMBODIMENTS

Figures 1, 2, 3, 4, 5, 6:
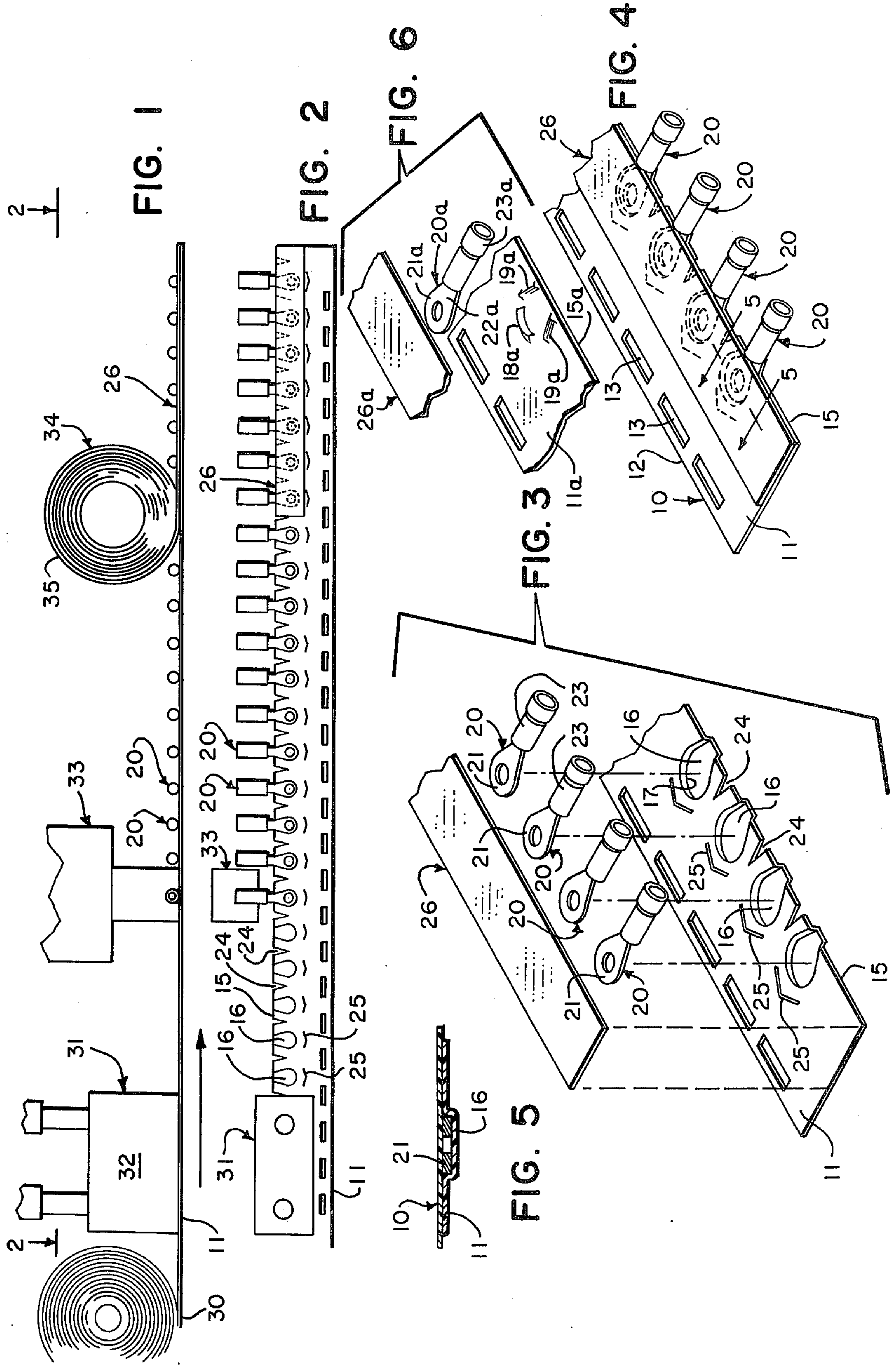
FIG. 1 is a diagrammatic elevational view showing the method of the instant invention and illustrating the several successive steps thereof.
FIG. 2 is a top plan view showing the method illustrated in FIG. 1.
FIG. 3 is an exploded perspective view of the carrier tape of the present invention.
FIG. 4 is a perspective view showing the carrier tape assembled.
FIG. 5 is a partial sectional view taken generally along the line 5—5 of FIG. 4.
FIG. 6 is an exploded perspective view showing a slightly modified form of carrier tape of the present invention.

Referring now more particularly to the drawings, and specifically FIGS. 4 and 5 thereof, the terminal carrying tape is there generally designated 10, and includes an elongate strip 11 fabricated of flexible, deformable material, such as polyester film or other suitable material. The strip 11 is provided at one longitudinal location, say along a side edge 12, with strip feeding means 13, such as a row of sprocket holes for cooperation with feeding teeth engageable through the holes. The sprocket wheels or other equivalent means may be conventional and are not shown herein.

Along the opposite longitudinal edge region of strip 11, adjacent to side edge 15, see FIG. 3, the strip is formed with a series of deformations, as at 16. In the embodiment of FIGS. 3–5, the deformations 16 are each depressed into the material of strip 11 forming a pocket therein, each of such pockets being bounded by an edge wall 17 of the strip material.

Considering now the terminals 20, which may be conventional, such terminals each includes an enlarged end region or head part 21, as for engagement with a pin or lug, which head part tapers outwardly, as at a reduced neck region 22, from which extends a barrel or ferrule part 23 adapted to receive a wire conductor and be crimped thereabout. Of course, a wide variety of terminals may be substituted for the type shown in the drawings, without departing from the teachings of the instant invention.

The deformations 16 are configured to conformably receive the head parts 21 of respective terminals 20, with the barrels or ferrules 23 located outwardly beyond the strip edge 15. Thus, each deformation or pocket 16 is of a tapering configuration toward and opening through the side edge 15. Thus, the connector head parts 21 may each be conformably engaged in a respective pocket 16 and positively held therein against appreciable rotation in the plane of the strip.

In addition to the head part receiving deformations 16, the strip 11 is formed adjacent to the deformations with a plurality of edge cuts 24, each interposed between an adjacent pair of pockets 16 and extending inwardly from the edge 15, and additional angulate cuts or slits 25 each disposed adjacent to and inward of a respective deformation 16. The angulate cuts or slits 25 are located in generally facing, adjacent, spaced relation with the inner end of a respective pocket 16.

In the interest of speed and economy, the head part receiving deformations 16 are advantageously formed by cold punching, and the cuts and slits 24 and 25 permit of the deformation without adversely affecting or otherwise distorting the straightness or rectitude of the overall strip. Of course, if desired, the deformations 16 may be formed thermally, or otherwise, if desired.

In assembly, see FIGS. 4 and 5, the terminal head parts 21 are each conformably engaged in a respective deformation 16, the terminal ferrules or barrels 23 extending laterally beyond the strip side edge 15, and a strip, tape or elongate sheet 26 is arranged extending along the carrier strip edge 15 overlying and adhesively secured to the adjacent carrier strip portion and upwardly facing surfaces of the terminal head parts 21. Thus, in the assembled condition shown in FIG. 4, the carrier tape 10 retains the terminals 20 against inadvertent dislodgement within or from the deformations 16, both by the positive restraining action of the deformation, including its side wall 17, and further by the adhesive holding action of the securement means or sheet 26.

As best seen in FIG. 5, the depth of a pocket 16 may be approximately equal to the thickness of terminal head part 21, so that the upper or outer surface of the terminal head part is substantially flush with the adjacent surface of the strip 11. However, the pocket or deformation 16 may be less depth, if desired, so that the head part 21 projects upward beyond the strip 11.

Considering the instant method of manufacture, best seen in FIGS. 1 and 2, the tape 11 may be unwound from a supply coil or reel 30, in which condition it may include the feeding means or sprocket holes 13, as a conventional film strip. Upon unwinding from the reel 30, the strip 11 passes rightward, as seen in FIGS. 1 and 2, along a generally straight path, and initially passes through a deformation station generally designated 31, wherein suitable die means 30 cut, slit and deform the strip 11 to produce the deformations 16 and cuts 24 and 25. The strip 11 is shown in this condition upon emerging from the deformation station 31. That is, as the strip is fed rightward one edge region adjacent to the rearward or upper edge 15 of the strip 11 is deformed to form the specifically configured deformations 16. The cuts or slits 24 and 25 may be formed simultaneously with the deformations 16, or prior thereto.

Downstream of the deformation station 31 is a terminal positioning station 33 which feed terminals 20 into position with their head parts respectively, conformably engaged in pockets 16 and their ferrules extending laterally beyond the strip edge 15.

Downstream of the positioning station 33, is an adhesive securing station 34, whereat an adhesive sheet 26 is adhesively applied overlying the terminal head parts and adjacent strip regions. The adhesive securement means 26 may be dispensed from a reel or coil 35 of adhesive coated sheet material. Thus, the assembly being fed rightward and discharged from the adhesive securement station 34, constitutes the previously described assembly of FIGS. 4 and 5, which may be coiled or wound for storage and handling, or fed directly to apparatus for attachment to wire conductors.

Considering now the embodiment shown in FIG. 6, a strip **11*a* may be generally similar to the strip 11, having feeding means or sprocket holes 13*a* along one longitudinal edge 12*a*. Along the other longitudinal edge 15*a* of the strip 11*a* may be formed a plurality of deformations 16*a* for respectively conformably receiving the head parts 21*a* of terminals 20*a* with the terminal ferrules 23*a* extending laterally beyond the strip edge 15*a***.

More specifically, the deformations **16*a* are each defined by a plurality of struck-up portions or bosses 18*a* and 19*a*, being located in generally triangular relationship. More specifically, the boss or protrusion 18*a*, formed of the material of strip 11*a*, is located inwardly for engagement with the inner end of the terminal head part 21*a*, while the bosses or protrusions 19*a*, being a pair of bosses formed of the material of strip 11*a*, are respectively located for conforming engagement with opposite edges of the tapering terminal head part region 22*a*. Thus, the terminal head part 21*a*, when conformably received in the deformation 16*a* defined by the bosses 18*a* and 19*a* is positively restrained against swinging movement relative to the strip 11*a***.

Additionally, securing means **26*a*, which may assume the form of an adhesive coated flexible sheet or strip, is applied in overlying relation with the terminal head part 21*a* and adjacent regions of the strip 11*a***, to effectively retain the terminals in proper assembly with the strip.

While the terminals of the different embodiments are thus properly retained in the desired assembled orientation with respect to the carrying strip, it will be appreciated that the ferrules or barrels are presented for reception of wire ends and crimping thereto. Further, a deliberate but not excessive force may serve to separate the terminals from the carrying strip, such dislodgement being effected when desired by release of the adhesive holding action of securing means **26, 26*a*, and flexure of the flexible strips 11 and 11*a***.

From the foregoing, it will be seen that the present invention provides a tape for carrying electric terminals and method of manufacturing the same, which are extremely simple in structure for reliability in use, and capable of automatic and economic assembly, and which otherwise fully accomplish their intended objects.

Although the present invention has been described in some detail by way of illustration and example for purposes of clarity of understanding, it is understood that certain changes and modifications may be made within the spirit of the invention.

What is claimed is:

1. A tape for carrying electric terminals which include noncircular enlarged head and reduced ferrule parts, said tape comprising a flexible strip of deformable material having a plurality of deformations formed in said tape along a side edge thereof, said deformations being embossed portions communicating with said tape side edge and specifically configured noncircular to receive therein conformably the terminal head parts with the respective ferrule parts extending laterally of the strip from the embossed portions beyond the side edge of said strip for assembly with a conductor, securing means extending along said strip to cover said embossed portions and said head parts for releasably securing said head parts to said strip, and feeding means on said strip for receiving a drive for feeding the strip with said terminals to an assembly location, said strip having cuts adjacent to said embossed portions to enable embossment without distorting the rectitude of said strip.

2. A tape according to claim 1, wherein embossed portions have a reduced dimension at said one side edge to reinforce retention of said head parts by said strip against lateral displacement.

3. A tape according to claim 1, said securing means comprising a flexible layer secured in overlying relation with said strip and head parts.

4. A tape according to claim 1, said feeding means comprising sprocket formations for feeding of said tape in a predetermined timed relation.

5. A tape according to claim 1, said embossed portions being defined by protrusions arranged to conformably engage said head parts and positively restrain the latter against swinging movement relative to said strip.

6. A tape according to claim 1, said embossed portions each being defined by a strip region contiguous to said strip side edge configured conformable to a terminal head part and offset in one direction from the plane of the strip to provide a terminal head part receiving pocket, said strip regions being offset no more than the thickness of the received terminal head parts to present the latter flush with or projecting beyond the plane of said strip, and said securing means comprising a covering adhesively secured to said strip and terminal head parts.

* * * * *